United States Patent
Saibel

(10) Patent No.: US 10,649,455 B2
(45) Date of Patent: May 12, 2020

(54) DEVICE, METHOD AND SYSTEM FOR DETERMINING A PILOT VEHICLE FOR AN AUTONOMOUS VEHICLE

(71) Applicant: Scania CV AB, Södertälje (SE)

(72) Inventor: Sergej Saibel, Strängnäs (SE)

(73) Assignee: Scania CV AB, Södertälje (SE)

( * ) Notice: Subject to any disclaimer, the term of this patent is extended or adjusted under 35 U.S.C. 154(b) by 91 days.

(21) Appl. No.: 15/554,351

(22) PCT Filed: Feb. 11, 2016

(86) PCT No.: PCT/SE2016/050101
§ 371 (c)(1),
(2) Date: Aug. 29, 2017

(87) PCT Pub. No.: WO2016/153408
PCT Pub. Date: Sep. 29, 2016

(65) Prior Publication Data
US 2018/0039274 A1  Feb. 8, 2018

(30) Foreign Application Priority Data

Mar. 24, 2015  (SE) ........................... 1550351

(51) Int. Cl.
*G05D 1/02* (2020.01)
*G08G 1/09* (2006.01)
(Continued)

(52) U.S. Cl.
CPC ........... *G05D 1/0214* (2013.01); *B60K 31/00* (2013.01); *B60W 30/00* (2013.01); *B60W 40/00* (2013.01);
(Continued)

(58) Field of Classification Search
CPC ....................................................... G08G 1/22
See application file for complete search history.

(56) References Cited

U.S. PATENT DOCUMENTS 8,509,982 B2  8/2013  Montemerlo et al.
8,838,321 B1  9/2014  Ferguson
(Continued)

FOREIGN PATENT DOCUMENTS

DE  102012208256 A1  11/2013
EP  2202601 A2  6/2010
(Continued)

OTHER PUBLICATIONS

Yuta S., Premvuti S., "Coordinating Autonomous and Centralized Decision Making to Achieve Cooperative Behaviors Between Multiple Mobile Robots", Proceedings of the I, Proceedings of the IEEE/RSJ International Conference on Intelligent Robots and Systems. Raleigh, N.C., Jul. 7-10, 1992; whole document.
(Continued)

*Primary Examiner* — Todd M Melton
(74) *Attorney, Agent, or Firm* — Moore & Van Allen PLLC; W. Kevin Ransom

(57) ABSTRACT

A device, a system and a method for an autonomous vehicle capable of independently travelling along a road and to communicate in a wireless way. The device is configured to determine a route for the autonomous vehicle, and to determine presence of any risk segment along the route. A risk segment is a segment of the road where the autonomous vehicle is determined to be in need of assistance based on characteristics of that road segment. If a risk segment is determined, the device is configured to perform a matching sequence in order to find a pilot vehicle capable of piloting the autonomous vehicle past the risk segment, and to generate information data α about a result of the performed matching sequence.

19 Claims, 2 Drawing Sheets

(51) Int. Cl.
  *G01C 21/34* (2006.01)
  *B60W 30/00* (2006.01)
  *B60K 31/00* (2006.01)
  *B60W 40/00* (2006.01)
  *G08G 1/00* (2006.01)
  *G08G 1/0967* (2006.01)
  *G05D 1/00* (2006.01)
  *G01S 13/931* (2020.01)

(52) U.S. Cl.
  CPC ....... *G01C 21/3461* (2013.01); *G05D 1/0027* (2013.01); *G05D 1/0088* (2013.01); *G05D 1/028* (2013.01); *G05D 1/0287* (2013.01); *G05D 1/0291* (2013.01); *G05D 1/0295* (2013.01); *G08G 1/096791* (2013.01); *G08G 1/22* (2013.01); *B60W 2550/402* (2013.01); *B60W 2550/408* (2013.01); *G01S 2013/9325* (2013.01); *G05D 2201/0213* (2013.01)

(56) References Cited

U.S. PATENT DOCUMENTS

| | | | |
|---|---|---|---|
| 8,880,272 | B1 | 11/2014 | Ferguson et al. |
| 9,261,882 | B2 * | 2/2016 | Kim .................... G05D 1/0287 |
| 9,511,764 | B2 * | 12/2016 | Pilutti .................. B60W 30/00 |
| 10,304,334 | B2 * | 5/2019 | Okabe .............. G08G 1/096827 |
| 2010/0063648 | A1 | 3/2010 | Anderson |
| 2010/0256835 | A1 | 10/2010 | Mudalige |
| 2013/0041576 | A1 | 2/2013 | Switkes et al. |
| 2013/0090802 | A1 | 4/2013 | Curtis et al. |
| 2015/0127189 | A1 | 5/2015 | Mehr et al. |

FOREIGN PATENT DOCUMENTS

| | | |
|---|---|---|
| JP | 2007164432 A | 6/2007 |
| KR | 100957137 B1 | 5/2010 |
| KR | 1020140068591 A | 6/2014 |
| WO | 2004077378 A1 | 9/2004 |

OTHER PUBLICATIONS

Lundberg, "Obemannade markfarkosters militra nytta inom omrdet logistiktransporter", Jun. 2012-, Jun. 21, 2012, Found at: http://www.diva-portal.org/smash/get/diva2:536356/FULLTEXT01.pdf; whole document.
International Search Report for PCT/SE2016/050101 dated Jun. 16, 2016.
Written Opinion of the International Searching Authority for PCT/SE2016/050101 dated Jun. 16, 2016.
International Preliminary Report on Patentability for PCT/SE2016/050101 dated Feb. 6, 2017.
Reply to Written Opinion for PCT/SE2016/050101 dated Apr. 25, 2017.
Scania CV AB, Korean Application No. 10-2017-7027899, Office Action, dated Mar. 29, 2019.
Scania CV AB, Swedish Application No. 1550351-9, Office Action, dated Jun. 16, 2016.
Scania CV AB, Swedish Application No. 1550351-9, Office Action, dated Sep. 29, 2015.
Scania CV AB, European Application No. 16769164.1, Extended European Search Report, dated Aug. 31, 2018.
Scania CV AB, European Application No. 16769164.1, Office Action, dated May 8, 2019.

* cited by examiner

DEVICE, METHOD AND SYSTEM FOR DETERMINING A PILOT VEHICLE FOR AN AUTONOMOUS VEHICLE

CROSS-REFERENCE TO RELATED APPLICATION(S)

This application is a national stage application (filed under 35 § U.S.C. 371) of PCT/SE16/050101, filed Feb. 11, 2016 of the same title, which, in turn claims priority to Swedish Application No. 1550351-9, filed Mar. 24, 2015 of the same title; the contents of each of which are hereby incorporated by reference.

FIELD OF THE INVENTION

The present disclosure relates to a device, a method and a system for an autonomous vehicle. The present disclosure further relates to a computer program, a computer program product and an autonomous vehicle comprising the device.

BACKGROUND OF THE INVENTION

Autonomous driving is a complicated task with high demands on knowledge of the environment. Changeableness of a previously mapped out road due to road works, accidents etc., and poorly marked roads, may make autonomous driving difficult and risky. To be able to handle such circumstances the autonomous vehicle could be equipped with more advanced sensing equipment, or require manual intervention. However, in both cases the gains made from driving autonomously are then reduced giving higher costs of transportation.

For example, in U.S. Pat. No. 8,509,982 zone driving is described where rules of a zone may require an autonomous vehicle to alert a driver of that vehicle. The vehicle may require the driver to take control of the steering, acceleration, deceleration, etc.

Wireless communication like vehicle to infrastructure (V2I) communication or vehicle to vehicle (V2V) communication gives the possibility to know road conditions and traffic conditions in advance. Autonomous vehicles may make use of this technology in order to get access to data in order to better plan their journey.

For example, in EP2202601 a method to conduct two vehicles is described, one unmanned slave-vehicle and one master vehicle. The slave-vehicle use information from the master vehicle to navigate. The information may be transmitted e.g. via radio communication.

US20130090802 illustrates an autonomous vehicle that is conducted by means of a leader vehicle. The autonomous vehicle may receive waypoints from the leader vehicle via wireless communication. In U.S. Pat. No. 8,880,272 an autonomous vehicle is shown that may calculate a trajectory based on two trajectories of two other vehicles and thereby avoid e.g. a road work.

SUMMARY OF THE INVENTION

Technology for autonomous driving is under development and in the future infrastructure and vehicles will be more adapted to autonomous driving. Meanwhile there is a need for making autonomous driving possible also with less advanced technology and infrastructure.

It is thus an object of the disclosure to provide a method for an autonomous vehicle to drive pass a difficult or inappropriate road segment. It is a further object to provide a method for an autonomous vehicle to drive pass a difficult or inappropriate road segment without manual intervention. These object and others are at least partly achieved by the device, the method, the vehicle, the system, the computer program P and the computer program product according to the independent claims, and by the embodiments according to the dependent claims.

With any of the described device, method, vehicle, system, computer program and computer program product, it is made possible to eliminate intervention of a driver when driving pass road segments that are determined to be risky, thus difficult or inappropriate for the autonomous driver to pass autonomously. There is then no need for expensive dedicated pilot vehicles, instead regular vehicles can be used for piloting the automated vehicle pass the risky road segment. The solution thus becomes a less expensive alternative than many other solutions and a step forward to accomplishing a fully autonomous driving.

According to a first aspect, the disclosure relates to device for an autonomous vehicle capable of independently travelling along a road and to communicate in a wireless way. The device is configured to determine a route for the autonomous vehicle 1, and to determine presence of any risk segment along the route. A risk segment is a segment of the road where the autonomous vehicle is determined to be in need of assistance based on characteristics of that road segment. If a risk segment is determined, the device is configured to perform a matching sequence in order to find a pilot vehicle capable of piloting the autonomous vehicle past the risk segment and to generate information data $\alpha$ about a result of the performed matching sequence.

According to a second aspect, the disclosure relates to an autonomous vehicle comprising a device as disclosed herein.

According to a third aspect, the disclosure relates to a method for an autonomous vehicle capable of independently travelling along a road and to communicate in a wireless way. The method comprises to determining a route of the autonomous vehicle and determining presence of any risk segment along the route. A risk segment is a segment of the road where the autonomous vehicle is determined to be in need of assistance based on characteristics of that road segment. If a risk segment is determined, the method comprises performing a matching sequence in order to find a pilot vehicle capable of piloting the autonomous vehicle past the risk segment, and generating information data $\alpha$ about a result of the performed matching sequence.

According to a fourth aspect, the disclosure relates to a system for an autonomous vehicle capable of independently travelling along a road and to communicate in a wireless way. The system comprises a processing unit and a memory unit with a computer program code. The computer program code is configured to make the system perform the method according to any of the steps as disclosed herein, when executed on the processing unit.

According to a fifth aspect, the disclosure relates to a computer program P, wherein the computer program P comprises a computer program code to cause a device, or a computer connected to the device, to perform the method according to any of the steps as disclosed herein.

According to a sixth aspect, the disclosure relates to a computer program product comprising a computer program code stored on a computer-readable medium to perform the method according to any of the steps as disclosed herein, when the computer program code is executed by a device or by a computer connected to the device.

DETAILED DESCRIPTION OF THE INVENTION

Figure 1:
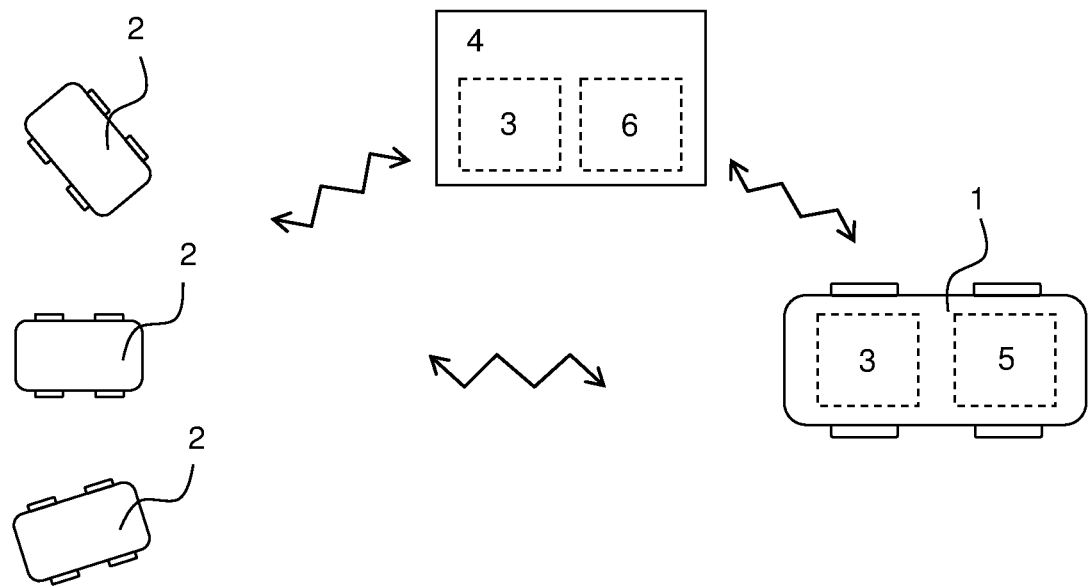
FIG. 1 illustrates a device according to the disclosure located remotely or in an autonomous vehicle.

FIG. 1 is illustrating an autonomous vehicle 1 and a plurality of other vehicles 2. The autonomous vehicle 1 may be arranged to be driven in several modes, for example manual mode, semi-autonomous mode and autonomous mode. In manual mode, the vehicle 1 is driven manually by a driver in the vehicle. In semi-autonomous mode, some functions of the vehicle 1 may be managed manually by a driver, and some functions may be managed autonomously. In autonomous mode, all functions in the vehicle are managed autonomously. For the purpose of this disclosure, the autonomous vehicle 1 is driven in autonomous mode. However, in autonomous mode a driver may still be present in the vehicle 1, or the vehicle 1 may be monitored at a distance by a supervisor, and the autonomous vehicle 1 may send messages for decision making to the supervisor or driver during the autonomous ride. The supervisor or driver may answer the message and the autonomous vehicle 1 may incorporate the answer of the supervisor or driver in its driving strategy.

The other vehicles 2 may be any kind of vehicle such as a regular private car or a truck, and be arranged to be autonomously, semi-autonomously or manually driven. The other vehicles 2 may for example be travelling on the same road network as the autonomous vehicle 1 or may be standing still in a garage or parking lot. The other vehicles 2 may be registered in a register as potential pilot vehicles, and the content of the register may be accessed by a device 3 upon request. The register may for example be maintained and updated by an external computer 4.

The autonomous vehicle 1 is arranged to communicate in a wireless way, as illustrated with bent arrows in the figure. Wireless communication is also referred to as radio communication. Wireless communication between two vehicles is referred to as vehicle-to-vehicle communication (V2V). The vehicle 1 may also be arranged to communicate with an external computer 4, server, road side unit or similar, or via the external computer 4, server, road side unit with another vehicle 2. Such wireless communication is referred to as vehicle-to-infrastructure communication (V2I). The wireless communication may also be conducted via mobile communication servers, via an application in a communication unit or via a server. The vehicle 1 is for the purpose of wireless communication equipped with a unit for wireless communication 5. The external computer 4 is for the purpose of wireless communication also equipped with a unit for wireless communication 6. The other vehicles 2 may also be arranged to communicate in a wireless way.

The autonomous vehicle 1 may be arranged with the device 3 which will be described in the following. The device 3 may instead be arranged in the external computer 4 remote from the autonomous vehicle 1.

Figure 2:
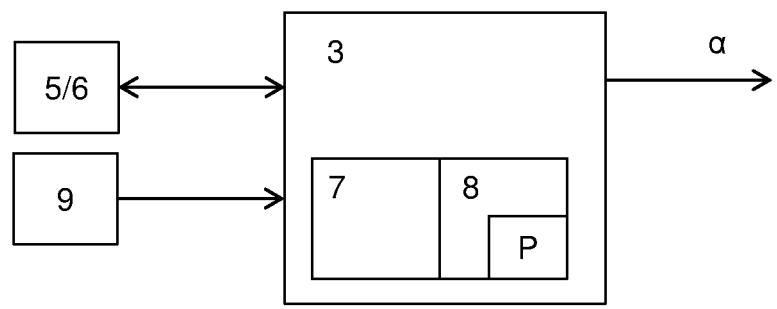
FIG. 2 is illustrating the device in FIG. 1 in more detail according to one embodiment.

In FIG. 2 the device 3 is illustrated in greater detail, and will now be explained in connection to this figure. The device 3 may be a control unit, for example an Electronic Control Unit (ECU). The device 3 includes a processing unit 7 and a memory unit 8. The processing unit 7 may be made up of one or more Central Processing Units (CPU). The memory unit 8 may be made up of one or more memory units. A memory unit may include a volatile and/or a non-volatile memory, such as a flash memory or Random Access Memory (RAM). The memory unit 8 further includes a computer program P including a computer program code to cause the device 3, or a computer connected to the device 3, to perform any of the method steps that will be described in the following.

The autonomous vehicle 1 may be arranged with a plurality of sensor units, generally noted as 9 in FIG. 2. The sensor units 9 may be arranged to send sensed data and/or generated data to the device 3 for further processing.

One kind of sensor unit 9 may be a positioning unit arranged to determine the position of the autonomous vehicle 1. The positioning unit may be configured to receive signals from a global positioning system such as GNSS (Global Navigation Satellite System), for example GPS (Global Positioning System), GLONASS, Galileo or Compass. Alternatively the positioning unit may be configured to receive signals from for example one or several distance detectors in the autonomous vehicle 1 that measure relative distances to for example a road side unit, nearby vehicles or similar with a known position. Based on the relative distance or distances the positioning unit may determine the position of the own autonomous vehicle 1. A detector may also be configured to detect a signature in for example a road side unit, whereby the signature represents a certain position. The positioning unit may then be configured to determine its own position via detection of the signature. The positioning unit may instead be configured to determine the signal strength in one or a plurality of signals from a base station or road side unit with known position, and thereby determine the position of the autonomous vehicle 1 by using triangulation. Some of above mentioned technologies may of course be combined to ensure a correct position determination of the autonomous vehicle 1. The positioning unit is configured to generate a position data with the position of the automated vehicle 1, and to send it to the device 3. Other kinds of sensor units 9 may be a radar unit, a lidar unit, a camera unit or a video unit. The sensor units 9 may monitor the surroundings of the autonomous vehicle 1, generate sensor data and send the sensor data to the device 3 for further processing.

The autonomous vehicle 1 may communicate internally between its units, devices, sensors, detectors etc. via a communication bus, for example a CAN-bus (Controller Area Network) which uses a message based protocol. Examples of other communication protocols that may be used are TTP (Time-Triggered Protocol), Flexray, etc. In that way signals and data described herein may be exchanged between different units, devices, sensors and/or detectors in the autonomous vehicle 1. Signals and data may instead be transferred wirelessly between the different units, devices, sensors and/or detectors.

In order to aid the autonomous vehicle 1 during travelling, the device 3 is configured to determine a route for the autonomous vehicle 1. The route for the autonomous vehicle 1 may be known in advance e.g. from a haulage contractor or from the autonomous vehicle 1 itself. According to another embodiment, the device 3 may have access to map data and may based on a starting position and final position of the autonomous vehicle 1 determine a route for the autonomous vehicle 1. For example may a driver sitting in the autonomous vehicle 1 give a starting position and a final position to a navigation unit in the autonomous vehicle 1.

The device 3 is further configured to determine presence of any risk segment along the route, where a risk segment is a segment of the road where the autonomous vehicle 1 is determined to be in need of assistance based on characteristics of that road segment. To be in need of assistance may include that the autonomous vehicle 1 is determined not to be able to drive pass the risk segment autonomously.

The characteristics of the road of the route are generally known in beforehand. There are numerous external suppliers collecting data and characteristics of roads, wherefrom these characteristics may be collected. The road characteristics may thus be given to the device 3. The characteristics may include any road characteristics necessary for the autonomous driving of the vehicle 1. For example, road data may include a virtual road network marked with characteristics such as traffic signs, road works etc. Any such characteristic should be positioned along the virtual road network. The road may be divided into segments according to their characteristics. Thus, segments may have different lengths. Instead, the road may be divided into segments with equal lengths, and have different characteristics within the segment. Updated road characteristics may also be gathered during travelling via wireless communication from other entities.

Autonomous vehicles 1 may be differently equipped and have different ability to navigate autonomously. One kind of autonomous vehicle 1 may be able to independently navigate pass a road segment that for another kind of autonomous vehicle 1 would be considered too risky to independently navigate pass. Also, at present some road segments cannot be navigated pass by any autonomous vehicle 1. By comparing characteristics of road segments along the route with characteristics of the autonomous vehicle 1, any risk segments along the route may be found. According to one embodiment, the device 3 is configured to determine characteristics of the autonomous vehicle 1 and to determine presence of a risk segment according to predefined rules for the characteristics of the autonomous vehicle 1 and the characteristics of the road segment. For example, the road segments may be classified in different levels A, B, C etc. according to their characteristics and/or difficulty. Level A is here a normal road segment, level B is a road work, C is a traffic accident etc. The autonomous vehicle 1 may then be allowed to drive autonomously along "level A" segments, but not "level B" or "level C" segments, in accordance with predefined rules for that autonomous vehicle 1 in accordance with its characteristics. Level B and level C segments are then considered as "risk segments" for the autonomous vehicle 1. The classification may generally be made in beforehand, or by the device 1 itself.

If a risk segment is determined the autonomous vehicle 1 is not allowed to independently navigate pass the risk segment. Instead a matching sequence is performed in order to find a pilot vehicle 2 capable of piloting the autonomous vehicle 1 past the risk segment. A pilot vehicle 2 may be any of the another vehicles 2 previously explained, capable of piloting the autonomous vehicle 1 pass the risk segment. According to one embodiment, the matching sequence includes to compare at least one route data of the route of another vehicle 2 with route data of the route of the autonomous vehicle 1, wherein the route data are of the same category. The device 3 is configured to determine a result of the comparison, and to determine if the another vehicle 2 is qualified as a pilot vehicle 2 for the autonomous vehicle 1 based on the result of the comparison.

Route data may be any or several of: an estimated position and time along the route, departure data and destination data. Route data of the another vehicle or vehicles 2 may be known in beforehand from e.g. haulage contractors and sent to the device 1. If the device 3 is present in the autonomous vehicle 3, the device 3 may send a request to the computer unit 4 for route data about the another vehicles 2, or send a request directly to the another vehicles 2 for route data about the another vehicles 2. The route data may then be sent to the device 3. If the device 3 is present in the remote computer unit 4, the route data may be collected from the another vehicles 2 or already be known by the device 3. The matching sequence may include to send a request to one or several of the another vehicles 2 asking if they are capable of acting as a pilot vehicle for the autonomous vehicle 1. The autonomous vehicle 1 may scan the environment itself to find another vehicle or vehicles 2. For example, the autonomous vehicle 1 may use V2V communication to find one or several another vehicles 2, and collect route data from the found another vehicles 2. The autonomous vehicle 1, or more precisely the device 3 present in the autonomous vehicle 1, may then locally perform any of the steps in the matching sequence described below. A local coordination between the another vehicle or vehicles 2 may thus be performed, which may be beneficial for example when no connection to the remote computer 4 can be established. To ensure that the another vehicle 2 is a trustworthy vehicle, the another vehicle 2 may be requested to exchange secure keys with the autonomous vehicle 1. The device 3 may also have a register with approved another vehicles 2 for piloting, and identification data retrieved from an another vehicle 2 may be compared with the data in the register. If the another vehicle 2 can be found in the register, the another vehicle 2 may be considered approved for piloting.

The various route data from the another vehicle or vehicles 2 are then matched with the route data of the autonomous vehicle 1. The goal with the matching sequence is to find another vehicle 2 that is capable of and is willing to act as a pilot vehicle for the autonomous vehicle 1 pass the risk segment. To find such a pilot vehicle, route data of the same category are matched, thus, time, position etc. A category may be defined as a route, position and/or time along the route, departure data or destination data. For example, if the another vehicle 2 is determined to drive the same route as the autonomous vehicle 1 including the risk segment, within a certain timeframe, the another vehicle 2 is qualified to be a pilot vehicle. The matching sequence may instead come to the result that there is no pilot vehicle to be found.

The device 3 is in any case configured to generate information data α about a result of the performed matching sequence. If an another vehicle 2 is found that is qualified as a pilot vehicle, the device 3 may be arranged to generate qualifying data for the another vehicle 2 including information about that the another vehicle 2 is qualified as a pilot vehicle for the autonomous vehicle 1. The qualifying data may include information about the route for the qualified vehicle and/or the autonomous vehicle 1.

After a qualified vehicle has been found, the qualifying data may be indicated to the driver or supervisor responsible for the autonomous vehicle 1, if any. The driver or supervisor may then be given a possibility to acknowledge that they want to accept the qualified another vehicle 2 as a pilot vehicle. Instead, the qualified vehicle may be directly determined to be a pilot vehicle. If several qualified another vehicles exist, the most appropriate qualified another vehicle may be chosen. The most appropriate qualified vehicle may be chosen based on e.g. a risk parameter, determined from statistical data of previous piloting experiences and/or distance and/or time from the automated vehicle 1. The longer the distance or time, the higher the risk that the piloting will not be successful, i.e. the chosen qualified another vehicle will not meet up with the automated vehicle 1. Thus, the qualified another vehicle with the lowest risk parameter may be chosen. Also, the pilot vehicle may be given a chance to accept being a pilot vehicle or not.

In most cases the route and/or timing of the route for the pilot vehicle is not exactly the same as for the autonomous vehicle 1. According to one embodiment, the device 3 is arranged to determine a modified route for the qualified pilot vehicle and/or a modified route for the autonomous vehicle 1 such that the pilot vehicle may act as a pilot for the autonomous vehicle 1 along the risk segment. The device 3 is further arranged to generate modified route data with the modified route or routes of the pilot vehicle and autonomous vehicle 1, respectively. The modified route data may be sent to the pilot vehicle and/or autonomous vehicle 1 depending on which vehicle that should change its route. The pilot vehicle and/or the autonomous vehicle 1 receive the changed route to e.g. a control unit (not shown) in the vehicle, and the control unit will regulate the vehicle accordingly.

The pilot vehicle may e.g. lower its velocity for a time period until the autonomous vehicle 1 is within a certain distance. The certain distance should be small enough such that the pilot vehicle and the autonomous vehicle 1 may communicate with each other via wireless communication. The certain distance may e.g. be 0-2 km. A handshaking between the vehicles may be performed to initiate the piloting. The pilot vehicle will then drive pass the risk segment and meanwhile continuously sending driving data of the pilot vehicle such as position, velocity, steering etc. to the autonomous vehicle 1. The driving data may include velocity, coordinates and heading of each position of the pilot vehicle. The autonomous vehicle 1 will receive the driving data and adapt its position and driving behavior accordingly. Alternatively or in combination, the autonomous vehicle 1 may follow the pilot vehicle by using sensed data of the pilot vehicle from sensing units 9 like a radar unit, a lidar unit, a camera unit and/or a video unit as will be more explained in the following. Thus, the autonomous vehicle 1 will mimic the behavior of the pilot vehicle pass the risk segment. When the autonomous vehicle 1 has driven pass the risk segment, the autonomous vehicle 1 continuous to drive autonomously in a normal way.

If only sensor units 9 are used to detect the position and driving pattern of the pilot vehicle, no wireless communication is necessary between the pilot vehicle and the autonomous vehicle 1. With this embodiment, preferably no vehicles are allowed in between the pilot vehicle and the autonomous vehicle 1. If however also or only driving data is communicated wirelessly from the pilot vehicle to the autonomous vehicle 1, one or several vehicles may be allowed in between the pilot vehicle and the autonomous vehicle 1.

During the piloting, the autonomous vehicle 1 may also react to other sensed data of the autonomous vehicle 1 that might compromise the safety of the autonomous vehicle 1 or the surroundings of the autonomous vehicle 1. The autonomous vehicle 1 may thus not blindly follow the pilot vehicle and will respect e.g. its own safety system.

Figure 3:
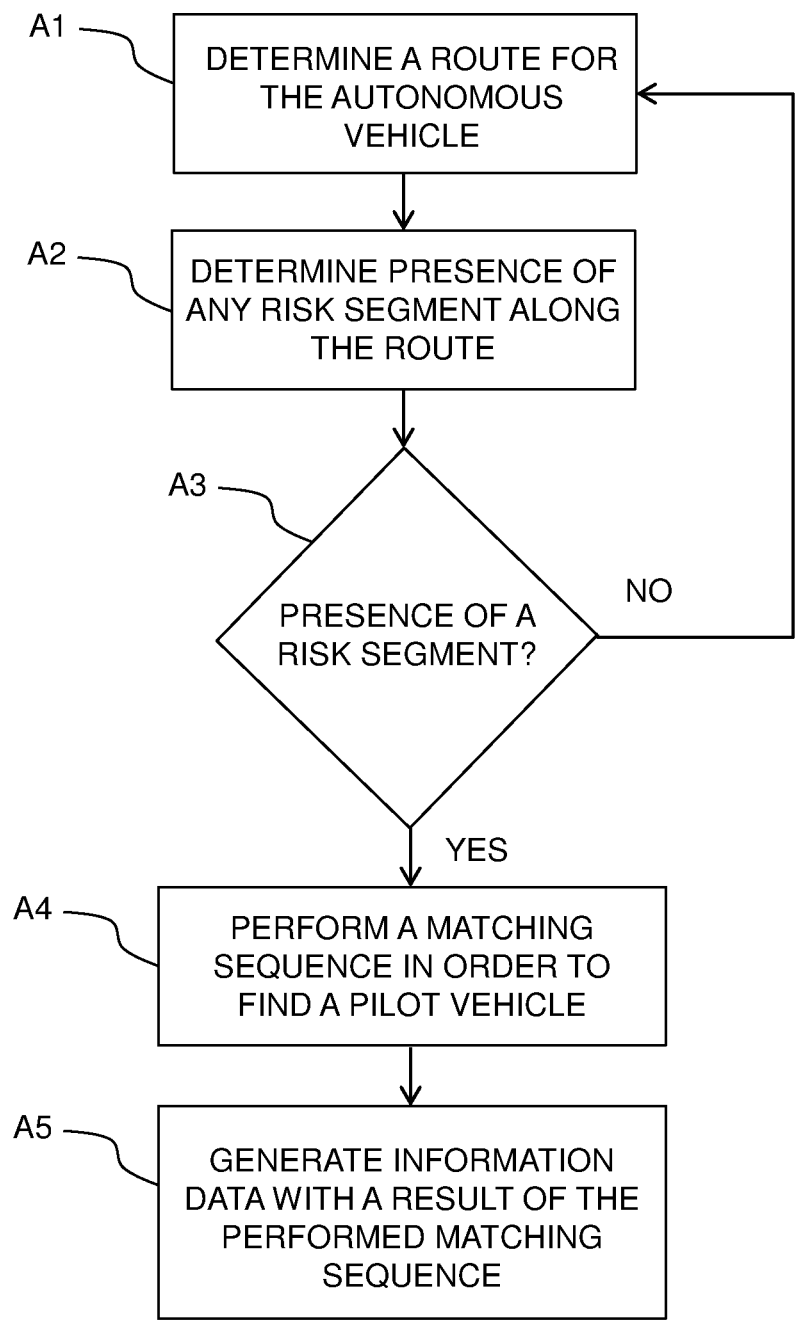
FIG. 3 is illustrating a method according to the disclosure according to one embodiment.

The disclosure also relates to a method, which will now be described with reference to the flowchart in FIG. 3. The method may be implemented as program code and saved in the memory unit 5 in the device 3 (FIG. 2). The method may thus be implemented with the above described hardware of the device 3 (FIG. 2) in the autonomous vehicle 1. The method comprises determining a route of the autonomous vehicle 1 (A1). The route is often known in beforehand e.g. from a haulage contractor or may be received from the autonomous vehicle 1 itself. The method further comprises determining presence of any risk segment along the route. A risk segment is a segment of the road where the autonomous vehicle 1 is determined to be in need of assistance based on characteristics of that road segment (A2). For example, the method may comprise determining characteristics of the autonomous vehicle 1, and determining presence of a risk segment according to predefined rules for the characteristics of the autonomous vehicle 1 and the characteristics of the road segment.

If a risk segment is determined, the method comprises performing a matching sequence in order to find a pilot vehicle 2 capable of piloting the autonomous vehicle 1 past the risk segment (A3). The matching sequence may include comparing at least one route data of the route of another vehicle 2 with a route data of the route of the autonomous vehicle 1, wherein the route data are of the same category, determining a result of the comparison, and determining if the another vehicle 2 is qualified as a pilot vehicle 2 for the autonomous vehicle 1 based on the result of the comparison. The route data may be any or several of: an estimated position and time along the route, departure data and destination data. If a risk segment not is determined, the method continues to (A1).

The method further comprises generating information data $\alpha$ about a result of the performed matching sequence (A4). If the another vehicle 2 is qualified as a pilot vehicle, the method may comprise generating qualifying data for the another vehicle 2 including information about that the another vehicle 2 is qualified as a pilot vehicle for the autonomous vehicle 1. The information data $\alpha$ may then include the qualifying data. The qualifying data may include information about the route of the autonomous vehicle 1. The qualifying data may be transmitted to the pilot vehicle for information that the vehicle has been chosen as pilot vehicle for the autonomous vehicle 1.

The pilot vehicle and the autonomous vehicle 1 now have to coordinate their routes such that the pilot vehicle may pilot the autonomous vehicle passed the risk segment. According to one embodiment, the method comprises determining a modified route for the qualified pilot vehicle and/or a modified route for the autonomous vehicle 1 such that the pilot vehicle may act as a pilot for the autonomous vehicle 1 along the risk segment, and generating modified route data with the modified route or routes of the piloting vehicle and/or autonomous vehicle 1, respectively. The modified route data is sent to the pilot vehicle and autonomous vehicle, respectively. The pilot vehicle may for example lower its velocity to wait for the autonomous vehicle 1. When the autonomous vehicle 1 is within a certain distance, e.g. a distance that allow wireless communication between the vehicles, or allow tracking of the pilot vehicle by using sensor units on the autonomous vehicle 1, the pilot vehicle may start piloting the autonomous vehicle 1 pass the risk segment. When the autonomous vehicle 1 is passed the risk segment, the piloting may stop and the autonomous vehicle 1 may continue drive on its own.

The disclosure also relates to a system for an autonomous vehicle 1 as described above. The system comprises the processing unit 7 and the memory unit 8 with the above described computer program code. The computer program code is configured to make the system perform any of the steps of the method as described above when the computer program code is executed on the processing unit 7. The computer program code may thus partly be executed on the remote computer 4, and partly on a device 3 residing in the autonomous vehicle 1.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A device for an autonomous vehicle capable of independently travelling along a road and to communicate in a wireless way, said device configured to:
    determine a route for the autonomous vehicle;
    determine presence of any risk segment along the route, where a risk segment is a segment of the road where the autonomous vehicle is determined to be in need of assistance based on specific characteristics associated with such road segment;
    if a risk segment is determined, perform a matching sequence in order to find a pilot vehicle from a plurality of possible vehicles with determined capabilities specific for piloting the autonomous vehicle past the risk segment by following the pilot vehicle; and
    generate information data about a result of the performed matching sequence.

2. The device according to claim 1, configured to determine characteristics of the autonomous vehicle and to determine presence of a risk segment according to predefined rules for the characteristics of the autonomous vehicle and the characteristics of the road segment.

3. The device according to claim 1, wherein the matching sequence includes to:
    compare at least one route data of the route of second vehicle from the plurality of possible vehicles with a route data of the route of the autonomous vehicle, wherein the route data are of a same category;
    determine a result of the comparison; and
    determine if the second vehicle is qualified as a pilot vehicle for the autonomous vehicle based on the result of the comparison.

4. The device according to claim 3, wherein the route data is any or several of: an estimated position and time along the route, departure data or destination data.

5. The device according to claim 3, wherein if the second vehicle is qualified as a pilot vehicle, the device is arranged to generate qualifying data for the second vehicle including information about that the second vehicle is qualified as a pilot vehicle for the autonomous vehicle.

6. The device according to claim 5, wherein the qualifying data includes information about the route of the autonomous vehicle.

7. The device according to claim 5, wherein the device is arranged to determine a modified route for the second vehicle that has been qualified as a pilot vehicle and/or a modified route for the autonomous vehicle such that the second vehicle may act as a pilot for the autonomous vehicle along the risk segment, and to generate modified route data with the modified route or routes of the second vehicle and/or autonomous vehicle, respectively.

8. The device according to claim 1 further configured to:
    in response to identifying a pilot vehicle, initiate a piloting of the autonomous vehicle using the pilot vehicle past the risk segment.

9. The device according to claim 1 further configured to:
    in response to identifying a pilot vehicle, initiate a piloting of the autonomous vehicle using the pilot vehicle past the risk segment; and
    stop piloting of the autonomous vehicle using the pilot vehicle, after the autonomous vehicle has passed through and exited the risk segment.

10. An autonomous vehicle capable of independently travelling along a road and to communicate in a wireless way comprising a device, said device configured to:
    determine a route for the autonomous vehicle;
    determine presence of any risk segment along the route, where a risk segment is a segment of the road where the autonomous vehicle is determined to be in need of assistance based on specific characteristics associated with such road segment;
    if a risk segment is determined, perform a matching sequence in order to find a pilot vehicle from a plurality of possible vehicles with determined capabilities specific for piloting the autonomous vehicle past the risk segment by following the pilot vehicle; and
    generate information data about a result of the performed matching sequence.

11. A method for an autonomous vehicle capable of independently travelling along a road and to communicate in a wireless way, the method comprises to:
    determining a route of the autonomous vehicle;
    determining presence of any risk segment along the route, where a risk segment is a segment of the road where the autonomous vehicle is determined to be in need of assistance based on specific characteristics associated with such road segment;
    if a risk segment is determined, performing a matching sequence in order to find a pilot vehicle from a plurality of possible vehicles with determined capabilities specific for piloting the autonomous vehicle past the risk segment by following the pilot vehicle; and
    generating information data about a result of the performed matching sequence.

12. The method according to claim 11, comprising determining characteristics of the autonomous vehicle and determining presence of a risk segment according to predefined rules for the characteristics of the autonomous vehicle and the characteristics of the road segment.

13. The method according to claim 11, wherein the matching sequence includes to:
    comparing at least one route data of the route of second vehicle from the plurality of possible vehicles with a route data of the route of the autonomous vehicle, wherein the route data are of a same category;
    determining a result of the comparison; and
    determining if the second vehicle is qualified as a pilot vehicle for the autonomous vehicle based on the result of the comparison.

14. The method according to claim 13, wherein the route data is any or several of: an estimated position and time along the route, departure data or destination data.

15. The method according to claim 13, wherein if the second vehicle is qualified as a pilot vehicle, the device is arranged to generate qualifying data for the second vehicle including information about that the second vehicle is qualified as a pilot vehicle for the autonomous vehicle.

16. The method according to claim 15, wherein the qualifying data includes information about the route of the autonomous vehicle.

17. The method according to claim 15, comprising determining a modified route for the second vehicle that has been qualified as a pilot vehicle and/or a modified route for the autonomous vehicle such that the second vehicle may act as a pilot for the autonomous vehicle along the risk segment, and to generate modified route data with the modified route or routes of the second vehicle and/or autonomous vehicle, respectively.

18. A computer program product comprising a computer program code stored on a non-transitory computer-readable medium readable by a computer, said computer program product used with an autonomous vehicle capable of independently travelling along a road and to communicate in a wireless way, said computer program code comprising computer instructions to cause one or more computer processors to perform the following operations:

determining a route of the autonomous vehicle;

determining presence of any risk segment along the route, where a risk segment is a segment of the road where the autonomous vehicle is determined to be in need of assistance based on specific characteristics associated with such road segment;

if a risk segment is determined, performing a matching sequence in order to find a pilot vehicle from a plurality of possible vehicles with determined capabilities specific for piloting the autonomous vehicle past the risk segment by following the pilot vehicle; and generating information data about a result of the performed matching sequence.

19. A system for an autonomous vehicle capable of independently travelling along a road and to communicate in a wireless way, wherein the system comprises:

a processing unit;

a memory unit; and a computer program product comprising a computer program code stored on a non-transitory computer-readable medium readable by a computer, said computer program product used with an autonomous vehicle capable of independently travelling along a road and to communicate in a wireless way, said computer program code comprising computer instructions to cause one or more computer processors to perform the following operations:

determining a route of the autonomous vehicle;

determining presence of any risk segment along the route, where a risk segment is a segment of the road where the autonomous vehicle is determined to be in need of assistance based on specific characteristics associated with such road segment;

if a risk segment is determined, performing a matching sequence in order to find a pilot vehicle from a plurality of possible vehicles with determined capabilities specific for piloting the autonomous vehicle past the risk segment by following the pilot vehicle; and generating information data about a result of the performed matching sequence.

\* \* \* \* \*